United States Patent [19]
Oono et al.

[11] Patent Number: 5,223,983
[45] Date of Patent: Jun. 29, 1993

[54] COMPOUND PRISM INCLUDING INTERFACES WITH CURVATURES OF THE ORDER OF A LASER WAVE LENGTH

[75] Inventors: Masahiro Oono; Koichi Maruyama; Masato Noguchi; Makoto Iki; Hitoshi Kimura; Masahiko Sasaki, all of Tokyo, Japan

[73] Assignee: Asahi Kogaku Kogyo Kabushiki Kaisha, Tokyo, Japan

[21] Appl. No.: 769,844

[22] Filed: Oct. 2, 1991

[30] Foreign Application Priority Data

Oct. 4, 1990 [JP] Japan ............... 2-104706[U]

[51] Int. Cl.⁵ .................................. G02B 27/10
[52] U.S. Cl. .................... 359/834; 359/731; 359/631; 359/638
[58] Field of Search ........... 359/833, 834, 831, 729, 359/731, 631, 638, 633, 634, 637, 629

[56] References Cited

U.S. PATENT DOCUMENTS

| | | | |
|---|---|---|---|
| 2,410,757 | 11/1946 | Street | 359/834 |
| 2,737,076 | 3/1956 | Rock | 359/634 |
| 3,407,715 | 10/1968 | McCutchen | 359/834 |
| 4,873,569 | 10/1959 | Hirosawa | 359/634 |
| 5,042,910 | 8/1991 | Dolezal | 359/831 |

FOREIGN PATENT DOCUMENTS

| | | | |
|---|---|---|---|
| 87244 | 8/1978 | Japan | 359/631 |
| 20704 | 2/1982 | Japan | 359/631 |
| 39008 | 2/1986 | Japan | 359/833 |
| 278821 | 12/1986 | Japan | 359/631 |
| 278822 | 12/1986 | Japan | 359/631 |

*Primary Examiner*—Jon W. Henry
*Attorney, Agent, or Firm*—Sandler, Greenblum & Bernstein

[57] ABSTRACT

A compound prism including a plurality of unit prisms which have reflective interfaces defined by outer and-/or inner surfaces thereof and which are arranged so that light is reflected by an inner surface of the interface of one of the unit prisms and by an outer surface of the interface of another unit prism.

13 Claims, 4 Drawing Sheets

COMPOUND PRISM INCLUDING INTERFACES WITH CURVATURES OF THE ORDER OF A LASER WAVE LENGTH

BACKGROUND OF THE INVENTION

1. Filed of the Invention

The present invention relates to a compound prism consisting of a plurality of prisms having a reflective interface or reflective interfaces.

2. Description of Related Art

A compound prism is used, for example, as a beam splitter in an optical magnetic recording and reproducing device (optical disc device). The beam splitter comprises a unit prism with a triangular shaped cross section and a unit prism with a parallelogram shaped cross section which is adhered to the triangular unit prism. The laser beam is made incident upon the triangular unit prism and is transmitted through the parallelogram unit prism to be incident upon an optical disc. The light reflected by the optical disc is made incident again upon the parallelogram unit prism and is split into signal light and servo light by semitransparent films provided on the parallel surfaces thereof.

In such unit prisms, the surfaces are polished to form the reflective surfaces on which the semitransparent films are then evaporated. Surface polishing is effected to make the reflective surfaces as geometrically flat as possible, although the polished surfaces tend to be either somewhat convex or concave as a result of the tendency of polishing machines to have the characteristic of either convex or concave polishing. Note that "concave" and "convex" surfaces referred to herein mean concavity and convexity of the order of a laser beam wavelength. This slight concavity or convexity can not be completely removed, even by the precision polishing.

Assuming that the parallel surfaces of a parallelogram unit prism are, for example, concave, the inner surfaces (internal reflection surfaces) thereof by which the laser beam is reflected are convex surfaces, i.e., the laser beam is reflected by the convex inner surfaces. In particular, a convex wave front aberration in the direction of transmission is produced in the laser beam by the first reflection, and the convex wave front aberration is enhanced by the second reflection. Consequently, if the laser beam having the convex wave front aberration is made incident upon a servo system or a signal reproducing system of the optical disc device, the servo control and the signal reproduction will not be precise due to the convex wave front aberration.

SUMMARY OF THE INVENTION

The primary object of the present invention is to provide an improved compound prism in which an adverse effect of the wave front aberration caused by the reflection can be eliminated or restricted.

Another object of the present invention is to provide an optical disc device using such an improved compound prism.

To achieve the object mentioned above, according to the present invention, there is provided a compound prism comprising a plurality of unit prisms which have interfaces defined by the outer and/or inner surfaces (external and/or internal reflection surfaces) thereof and which are arranged so that light is reflected by the inner surface of the interface of one of the unit prisms and by the outer surface of the interface of another unit prism so that reflection occurs at both concave and convex surfaces.

With this arrangement, even if convexities or concavities are produced on the surfaces of the unit prisms, the wave front aberration which is caused due to the convexities or concavities will be cancelled by the reflection(s) by both inner and outer surfaces of the interface.

According to another aspect of the present invention, a compound prism having three identical unit prisms adhered to each other comprises semitransparent films provided on the connecting surface between the first and second unit prisms, a connecting surface between the second and third unit prisms, and a remaining surface of the third unit prism which is not connected to the second unit prism.

According to another aspect of the present invention, an provided a optical disc device includes a beam splitter which reflects a laser beam toward a optical disc and which splits the light reflected from the optical disc into a signal reproducing light and a servo control light, wherein the beam splitter comprises three unit prisms adhered to each other, and semitransparent films provided on a connecting surface between the first and second unit prisms, a connecting surface between the second and third unit prisms, and a remaining surface of the third unit prism which is not connected to the second unit prism. The provision is also made to an optical prism comprising a plurality of unit prisms having reflective surfaces and adhered to each other, wherein light incident upon the optical prism is reflected more than one time by both the inner and outer surfaces of the reflective surfaces.

According to still another aspect of the present invention, a reflecting device comprises at least one mirror body having a reflecting surface, and, at least one prism body having an interface at which a light beam, reflected by said mirror reflecting surface, is internally s reflected.

The present disclosure relates to subject matter contained in Japanese Utility Model application No. 2-104706 (filed on Oct. 4, 1990) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENTS

Figure 5:
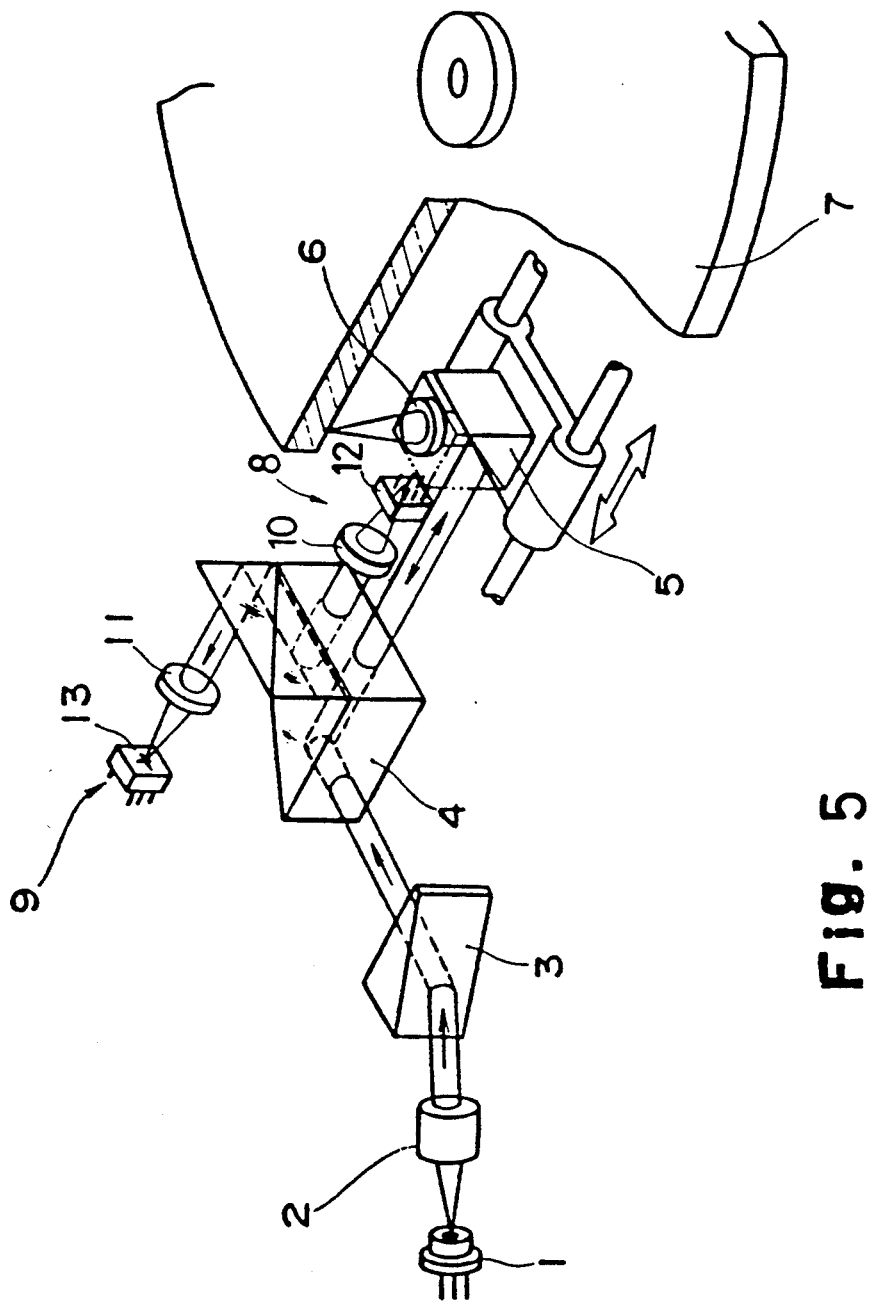
FIG. 5 is a schematic perspective view of an optical disc device to which the present invention is applied; and, FIG. 6 is a schematic plan view of a beam splitter according to the prior art.

FIG. 5 shows an optical disc device using a compound prism according to the present invention. In the optical disc device shown in FIG. 5, the laser beam emitted from a laser source 1, such as a semiconductor laser is collimated by a collimating lens 2 and is formed into a circular flux of beams by a beam shaping prism 3. The beams are then transmitted through a beam splitter 4 and reflected by a mirror 5 to be converged onto an optical disc 7 by an objective lens 6.

The laser beams reflected by the optical disc 7 are reflected by the mirror 5 and made incident upon the beam splitter 4 in which the beam is split into signal light and servo control light. The signal light is made incident upon a signal reproducing optical system 8 and the servo control light is made incident upon a servo optical system 9 for controlling the focusing and the tracking. The optical Systems 8 and 9 include condenser lenses 10, 11 and sensors 12, 13, respectively.

Figure 1:
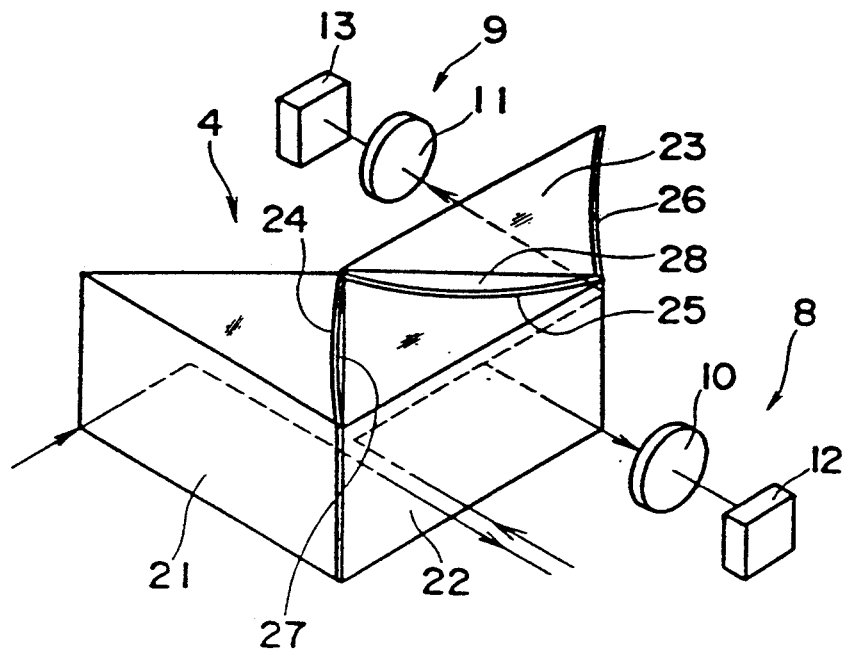
FIG. 1 is a perspective view of a compound prism according to a first embodiment of the present invention.
Figure 2:
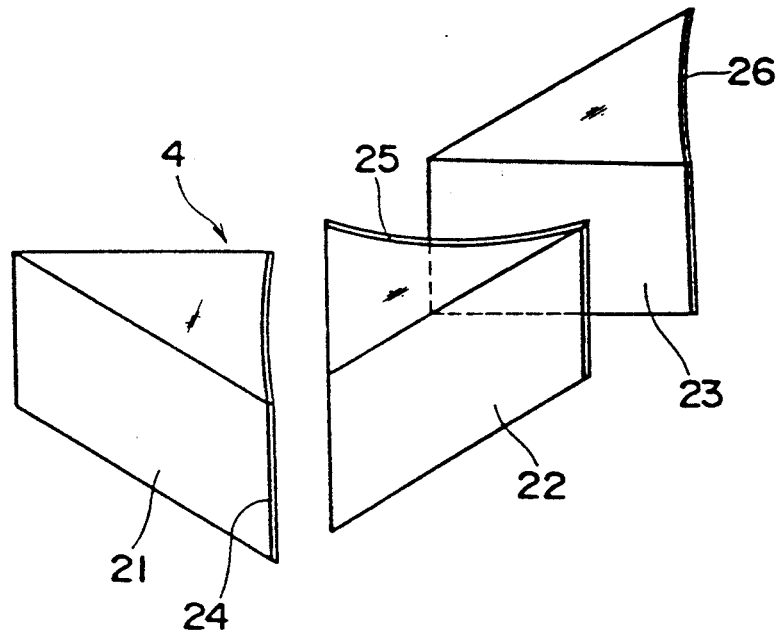
FIG. 2 is an exploded perspective view of unit prisms of a compound prism shown in FIG. 1.
Figure 3:
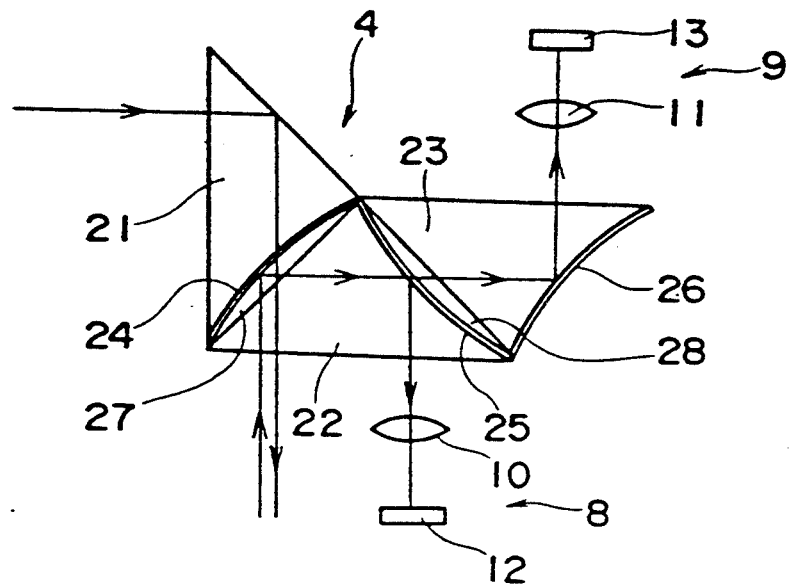
FIG. 3 is a schematic plan view of a beam splitter shown in FIG. 1 for explaining the reflection of light thereby.

The beam splitter 4 according to a first embodiment of the present invention is constructed as shown in FIGS. 1 through 3.

The beam splitter 4 comprises of three identical unit prisms (rectangular prisms) 21, 22, and 23 in combination. In particular, the first, second and third unit prisms 21, 22, and 23 have oblique surfaces (interfaces) which are provided with a thin metal layer (or dielectric film) which is evaporated thereon to form semitransparent films 24, 25, and 26, respectively. The semitransparent films 24, 25, and 26 are opposed and adhered to the other oblique surfaces (interfaces) of the adjacent unit prisms by adhesives 27 and 28 which have substantially the same refractive index as the unit prisms 21, 22, and 23.

The three unit prisms 21, 22, and 23 are made of a rectangular glass rod which is first polished, and then subject to an evaporation treatment on one of the oblique surfaces to form a semitransparent film, and is finally cut at a predetermined length. Consequently, as the prisms are of a uniform concavity or convexity and the semitransparent films are of a uniform thickness, the oblique surfaces of the prisms have the same convexity or concavity with, as without, the semitransparent film (Note: that the concavity is exaggerated in the drawings). It is noted that the concavity is in the order of a wavelength of the laser.

In the beam splitter 4 as constructed above, the light beam from the laser source is incident upon the first unit prism 21 and is totally reflected by the inner surface of one of the interfaces and is then transmitted through the semitransparent film 24. The outgoing light beam from the semitransparent film 24 is incident upon the objective lens off the mirror 5 and is focused on the optical disc 7, as shown in FIG. 5.

On the other hand, light reflected by the optical disc 7 is made incident upon the second unit prism 22 and is reflected by the semitransparent film 24. The reflected light is partly reflected by the semitransparent film 25 of the second unit prism 22 toward the signal reproducing optical system 8. The light transmitted through the semitransparent film 25 is reflected by the semitransparent film 26 of the third unit prism 23.

Consequently, particularly looking at the light reflected from the optical disc 7, the light to be made incident upon the signal reproducing optical system 8 is first reflected by the outer surface, i.e., the concave surface of the semitransparent film 24 formed on the concave interface of the first unit prism 21 adjacent to the second unit prism 22 and is then reflected by the inner surface, i.e., the convex surface of the semitransparent film 25 formed on the concave interface of the second unit prism 22. As a result, the light is reflected by both the concave surface and the convex surface, respectively, so that the effect of the concave surface and the convex surface is cancelled, consequently avoiding a wave front aberration.

The light to be made incident upon the servo control optical system 9 is incident upon the second unit prism 22 and is then reflected by the outer surface, i.e., the concave surface of the semitransparent film 24 formed on the concave interface of the first unit prism 21. The light is then transmitted through the second unit prism 22 and the semitransparent film 25 and then reflected by the inner surface, i.e., the convex surface of the semitransparent film 26 formed on the concave interface of the third unit prism 23. As a result, the servo control light is also reflected by both the concave surface and the convex surface, respectively, so that the effect of the concave surface and the convex surface is cancelled, again avoiding a wave front aberration.

Thus, the outgoing signal light and servo control light which has no wave front aberration can be made incident upon the signal reproducing optical system 8 and the servo control optical system 9, respectively, so that the signal reproduction and the servo control can be precisely carried out.

Since the compound prism according to the present invention comprises a combination of identical unit prisms, as described above, it is not necessary to prepare different unit prisms as in the prior art where different types of unit prisms, e.g., a triangular unit prism and a parallelogram unit prism are required to make a compound prism. This simplifies the manufacturing process of the compound prism and reduces the manufacturing cost thereof.

It is possible to substitute the first unit prism, in which the light beam is reflected by the semitransparent film evaporated thereon, with a mirror.

Although the polished surfaces of the unit prisms are concave surfaces in the illustrated embodiment, the present invention can be applied to convex surfaces.

It is also possible to replace the semitransparent film of each unit prism with a polarization film through which only a P-polarized light or S-polarized light (linearly polarized light) can be transmitted.

Figure 4:
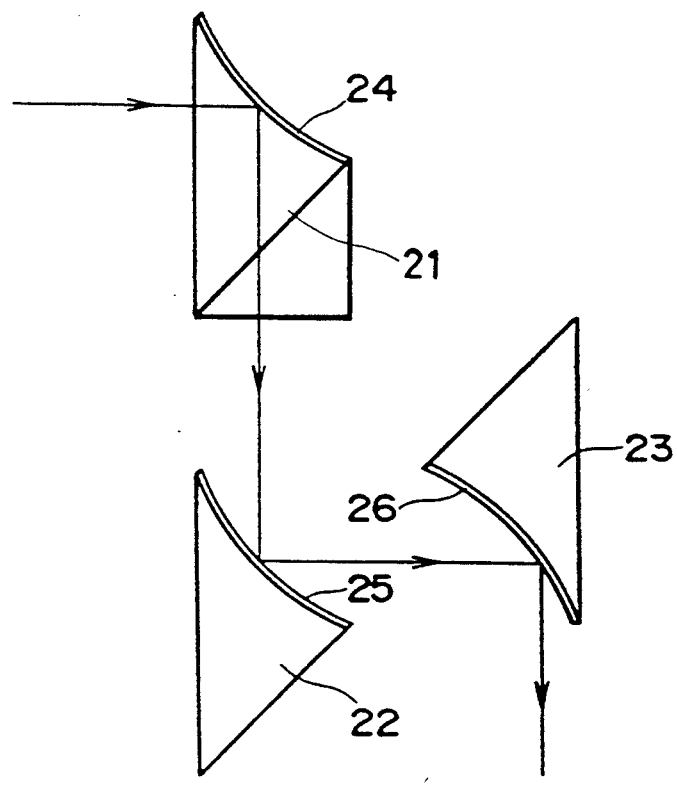
FIG. 4 is a plan view of a compound prism according to a second embodiment of the present invention.

FIG. 4 shows a second embodiment of the present invention.

In the first embodiment, the wave front aberrations caused by the reflection at the concave and convex surfaces are cancelled and eliminated by an equal number of reflections by the concave Surfaces and the convex surfaces in a medium having the same refractive index as that of the concave and convex surfaces. If the concave and convex surfaces are located in a medium having a refractive index different from that of the concave and convex surfaces, an adverse influence occurs when light is reflected by the inner surface of a unit prism. This can be eliminated by two or more reflections by the outer surfaces of the other unit prisms in a medium of lower refractive index, as shown in FIG. 4.

In the second embodiment illustrated in FIG. 4, the unit prisms 21, 22, and 23, which are separated in air, are made of glass having a refractive index of 1.8. The light reflected by the inner convex surface of the semitransparent film 24 of the first unit prism 21 is reflected by both the outer concave surfaces of the semitransparent films 25 and 26 of the second and third unit prisms 22 and 23.

Consequently, the wave front aberration caused by the first reflection by the convex surface (or the concave surface) in the medium (first unit prism 21) having a refractive index of 1.8 is cancelled and eliminated by the second and third reflections by the concave surfaces (or the convex surfaces) of the second and third unit prisms 22 and 23 in another medium, i.e., in the air which has a refractive index which is approximately equal to 1.

Figure 6:
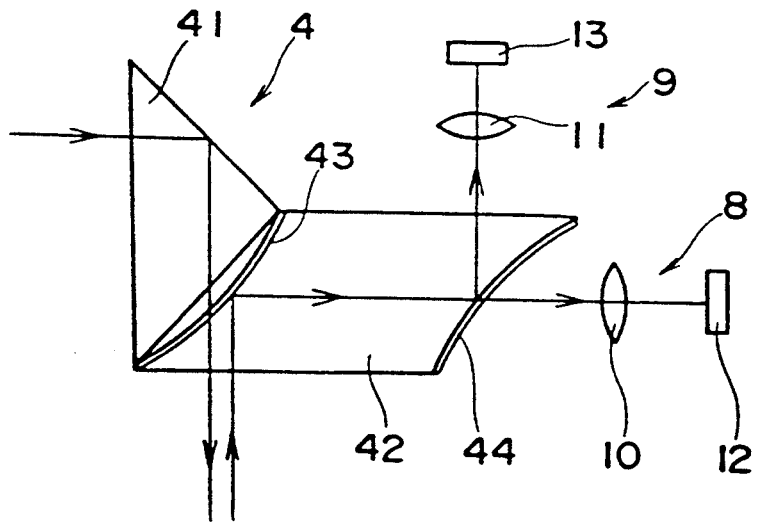

In FIG. 6 shows a known beam splitter 4'. In FIG. 6, the beam splitter 4' includes a first unit prism 41 having a triangular shape in cross section and a second unit prism 42 having a parallelogram shape in cross section and adhered to the first unit prism 41. The semitransparent films 43 and 44 are formed on the surfaces of the second unit prism 42 by evaporation. Light is partly transmitted and partly reflected by the semitransparent films 43 and 44.

If the prism surfaces defined by the semitransparent films 43 and 44 are concave, the laser beam reflected by the optical disc 7 and incident upon the beam splitter 4' is reflected by the convex inner surface of the semitransparent film 43, of the unit prism 42 and is then reflected by the convex inner surface of the opposite semitransparent film 44 of the unit prism 42. Consequently, a wave front, aberration which is convex in the direction of the transmission of the laser is produced by the first reflection by the semitransparent film 43 (convex surface). The wave front aberration is enhanced by a second reflection by the semitransparent film 44 (convex surface).

As a result, the outgoing laser toward the servo control optical system 9 contains the enhanced convex wave front aberration, so that the beam will not be precisely converged as a beam spot onto the sensor 13 by the lens 11. This has an adverse influence on the servo control.

The same is true in the signal reproducing optical system 8. Namely, the signal light can not be precisely converged as a beam spot onto the sensor 12 by the lens 10.

As can be understood from the above discussion, according to the present invention, since the compound prism comprises identical unit prisms in combination to form a beam splitter or an optical reflector in which the light is reflected at least once by both the inner surface and the outer surface of the unit prism(s), a wave front aberration due to the convexity or concavity of the prism surfaces will not occur.

Needless to say, the application of the present invention is not limited to the optical disc device as described above, and can be generally directed to various optical equipment for the reflection of light using a prism.

We claim:

1. A compound prism comprising a plurality of unit prisms, each unit prism having interfaces defined by outer and/or inner surfaces thereof, and said prisms being arranged so that light is reflected by an inner surface of an interface of one of the unit prisms and by an outer surface of an interface of another unit prism, wherein the interfaces of the unit prisms include a convexity or concavity of the order of a laser wavelength, the convexity or concavity of the respective interfaces being substantially uniform, whereby wave-front aberration is avoided.

2. A compound prism according to claim 1 wherein the unit prisms are provided with semitransparent films which permit a part of the light to be transmitted therethrough and a part of light to be reflected thereby.

3. A compound prism according to claim 1, wherein the unit prisms are connected to each other.

4. A compound prism according to claim 3, wherein the unit prisms are adhered to each other by an adhesive having a refractive index substantially identical to that of the unit prisms.

5. A compound prism according to claim 4, wherein semitransparent films are provided on the connecting surfaces of the unit prisms.

6. A compound prism according to claim 5, wherein the unit prisms are identical to each other.

7. A compound prism according to claim 1, said compound prism being a beam splitter for a optical disc device having an optical disc, so that light reflected from the optical disc is split into signal reproducing light and servo control light.

8. A compound prism according to claim 7, wherein the beam splitter comprises first, second, and third unit prisms which are adhered to each other.

9. A compound prism according to claim 8, wherein a laser beam is reflected by an inner surface of the interface of the first unit prism and is transmitted through a connecting surface of the first and second unit prisms to be made incident upon the optical disc, light reflected by the optical disc being reflected by the semitransparent file provided on the connecting surface of the second and third unit prisms, and light transmitted through the semitransparent film on the connecting surface of the second and third unit prisms being reflected by an inner surface of the interface of the third unit prism.

10. A compound prism according to claim 9, wherein the connecting surface between the first unit prism and the second unit prism, the connecting surface between the second unit prism and the third unit prism, and a remaining surface of the third unit prism, and a remaining surface of the third unit prism are provided with semitransparent films.

11. A compound prism according to claim 10, wherein an inner surface of the interface of one of the unit prisms and an outer surface of the interface of another unit prism are separated in a medium which has a different refractive index.

12. A compound prism according to claim 11, wherein said one unit prism and the other unit prism are located so that the number of reflections in the medium having a refractive index is larger than the number of reflections in the other medium having a higher refractive index.

13. A compound prism according to claim 1, wherein the number of reflections of light by respective inner and outer surfaces of the unit prisms is an even number.

* * * * *